No. 838,253. PATENTED DEC. 11, 1906.
W. P. HUSSEY.
TRANSFER TRUCK.
APPLICATION FILED MAY 3, 1906.
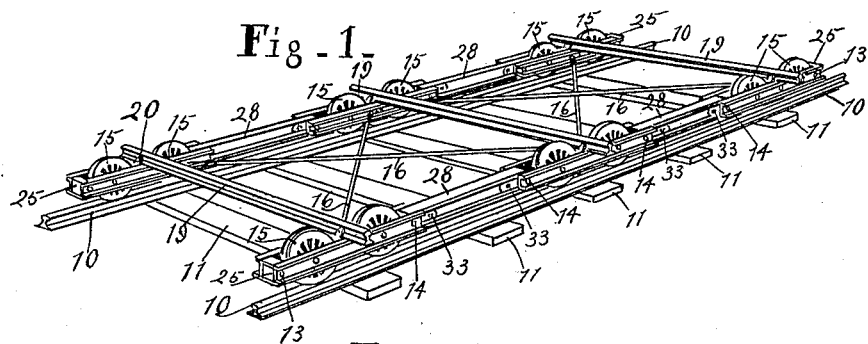
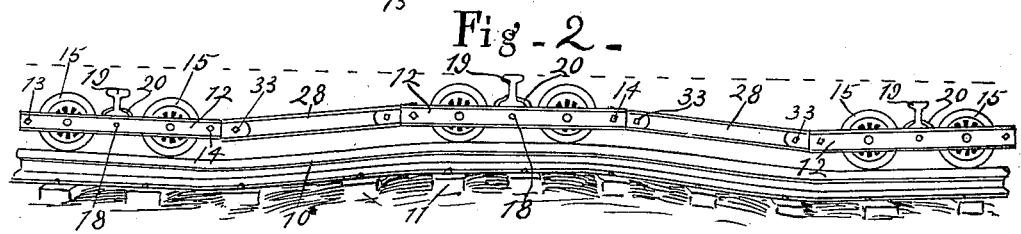
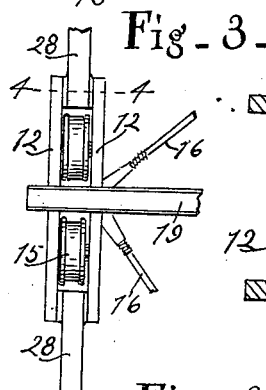 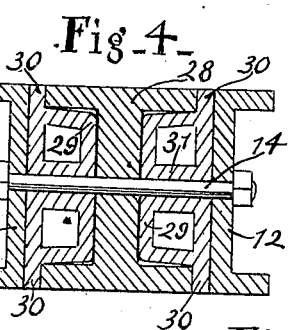 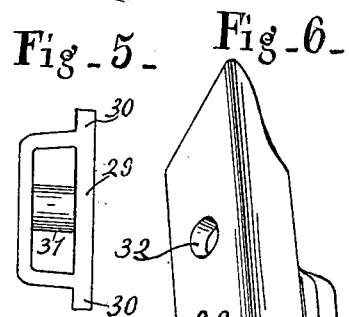 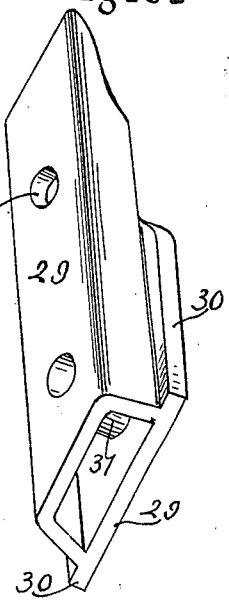
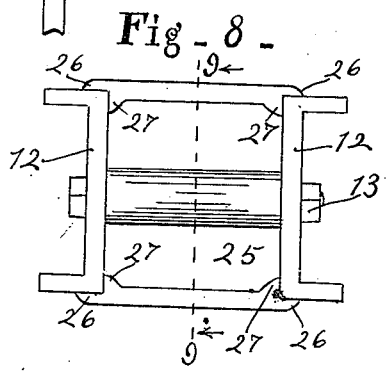 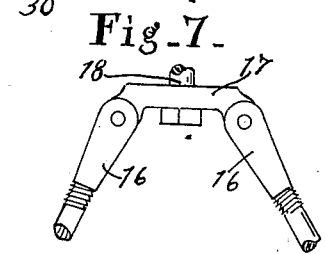
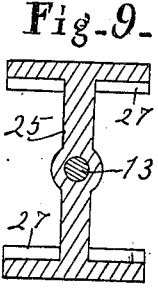

UNITED STATES PATENT OFFICE.

WILLIAM P. HUSSEY, OF INDIANAPOLIS, INDIANA, ASSIGNOR TO THE STANDARD DRY KILN COMPANY, OF INDIANAPOLIS, INDIANA, A CORPORATION OF INDIANA.

TRANSFER-TRUCK.

No. 838,253.     Specification of Letters Patent.     Patented Dec. 11, 1906.

Application filed May 3, 1906. Serial No. 314,936.

*To all whom it may concern:*

Be it known that I, WILLIAM P. HUSSEY, of Indianapolis, county of Marion, and State of Indiana, have invented a certain new and useful Transfer-Truck; and I do hereby declare that the following is a full, clear, and exact description thereof, reference being had to the accompanying drawings, in which like figures refer to like parts.

The object of this invention is to provide a truck that is inflexible laterally, but is vertically flexible to a limited extent, at least, to adapt it to run on a railway that is uneven, as is the case with tracks used around lumber-driers, dry-kilns, and other places for conveying material. The tracks in such instances are laid usually upon insecure foundations, so that great weights cause the track to become uneven. The result is that with rigidly-constructed trucks the entire load is thrown on only part of the wheels at times. This is useful in tracks running into dry-kilns, where the track is horizontal as it approaches the kiln and inclines within the kiln.

The chief feature, therefore, of this invention consists in the longitudinal flexibility of the truck in a vertical direction. As shown herein, this object is accomplished by placing a vertically-flexible connection between the truck units at each side of the truck.

Another feature consists in the idea of building up a truck of truck units, each of which consists of a frame and two closely-associated wheels. These truck units are connected transversely by rigid means and longitudinally by flexible connections and with braces extending between the diagonally-located truck units that make up a truck.

The nature of this invention will be understood from the accompanying drawings and the following description and claims.

In the drawings, Figure 1 is a perspective view of a section of a track with a flexible truck thereon. Fig. 2 is a side elevation thereof. Fig. 3 is a plan view of one truck unit and associated parts, some parts being broken away. Fig. 4 is a section on the line 4 4 of Fig. 3, showing the flexible joint in cross-section. Fig. 5 is an end view of one of the parts forming said flexible joint. Fig. 6 is a perspective view thereof. Fig. 7 is a plan view of the brace connection with one truck unit, parts being broken away. Fig. 8 is an elevation of the outer end of a truck unit. Fig. 9 is a section on the line 9 9 of Fig. 8.

In detail there is shown a railway formed of the rails 10 upon the cross-ties 11. The truck shown herein consists of six truck units arranged transversely in pairs and there being three on each side longitudinally of the truck. However, as will appear later, the truck units may be arranged in any number, either longitudinally or laterally, or in both directions. Each truck unit consists primarily of a frame and a pair of wheels close together.

The frame of the truck units shown in the drawings consists of a pair of channel-bars 12, with their flanges extending outwardly. They are secured together by bolts 13 and 14, with spacers between them, that will be explained later. A pair of wheels 15 are mounted between said channel-bars, with their spindles having bearing in said channel-bars.

The spacers between the ends of the truck units at the extreme ends of the truck are, as herein shown, somewhat different in form from the spacers at the inner ends of the truck units, where the trucks are united with longitudinally-connecting means. At the extreme outer end of the truck the truck units have each a spacer 25 between the pair of channel-bars, as shown in Fig. 8. It is formed preferably in cross-section as shown in Fig. 9, with the flanges 26 and 27 at a right angle to each other that rest against and upon the channel-bars. The bolt 13 passes through a central opening and clamps the parts together. This spacer is wide at the top and bottom and also has a web from the top to the bottom, so that it tends to resist both horizontally and vertically independent movement of the channel-bars.

The truck units in the truck are connected in a longitudinal series by rigid connecting-bars 28, with flexible union between said bars and the inner ends of the truck units, such as is shown in Figs. 4, 5, and 6. The connecting-bar shown is an I-beam; but it may be otherwise formed. The lateral flanges of the I-beam 28 overlap the inward extensions 29 of the inner spacing-blocks. These inner spacing-blocks are formed, as shown in Figs.

4, 5, and 6, with the inner extensions 29 and the outer vertical plate 30, the latter being only about one-half the length of the former. A hole 40 for the bolt 14 extends through the parts 29 and 30 and an intervening connection 31. A hole 32 extends through only the extension 29, so that the bolt 33 passes through only said extension and the connecting-bar 28. The part 29 fits in between the top and bottom flanges of said connecting-bar, so that there is a rigid connection between the parts 28 and 29 and a vertically-pivotal connection between the channel-bars 12 and the combined parts 29 and 30. This pivotal connection is on the bolt 14, the plain outer vertical face of the plate 30 bearing against the plain inner vertical face of the channel-bar 12. In Fig. 4, assuming the channel-bars 12 to be stationary, the connecting-bar 28 and the spacer on each side are united together and pivoted on the bolt 14.

A transfer track-rail 19 or other rigid connection is secured upon the transversely-disposed truck units and lies upon the frames thereof between the wheels, being held in place by some suitable fastening 20—such, for example, as is shown in my former patent, No. 802,166, issued October 17, 1905, on a transfer-truck. This track-rail rigidly connects the truck units transversely, whether there are two, as shown, or more. The diagonally opposite truck units forming a truck are also braced by the diagonal braces 16. These are pivoted to the plate 17, that is secured to the inner side of each truck unit by a bolt 18 near the middle thereof, as seen in Fig. 3.

It is thus seen that I am enabled to provide a truck of any desired length or width the parts of which are vertically flexible by reason of the longitudinally-flexible connections and that such truck is made up of truck units substantially alike that may be placed together to form a truck of any desired length or width. The connection and arrangement are such as to make the truck a strong one, that prevents lateral play or looseness of the parts, and yet permits vertical play for running over the track. Each truck unit has two wheels close together near the load or transfer-rail, one wheel being on each side thereof. This double-wheel construction of the truck distributes the load over the track. This truck when loaded with flexible material, like lumber piled flatwise thereon, can run over an uneven track or run from a horizontal track onto an inclined track in a dry-kiln or out on a horizontal track at the opposite end of the kiln without increasing or diminishing the portion of the load that rests on any one wheel of the truck.

What I claim as my invention, and desire to secure by Letters Patent, is—

1. A truck including a plurality of truck units, a rigid connecting-bar between the truck units of the respective sides of the truck, flexible unions between said rigid connecting-bars and truck units, and braces pivotally connected with the diagonally opposite truck units.

2. A truck including a plurality of truck units, each having a pair of bars at each side thereof with vertically-disposed surfaces, a plurality of wheels mounted between each pair of bars, a bar connecting the adjacent ends of each pair of truck units at each side of the truck, said connecting-bar being in the form of an I-beam, a spacer-plate rigidly secured to each side of said connecting-bar at the ends thereof with an extension between the flanges of said bar and an external plate with a vertically-disposed surface that bears against the bars of the truck units, and a clamping-bolt extending through the bars of the truck units, said spacing-plates and connecting-bar, substantially as set forth.

3. A truck including a pair of bars with vertically-disposed faces at each side thereof, wheels between said bars, a spacer between said bars consisting of a vertical plate with top and bottom horizontal plates integral therewith, said vertical plate having a hole through it, and the lateral ends of the top and bottom plates having notches to engage the angular inner corners of said bars, and a clamping-bolt extending through said bars and spacer, substantially as set forth.

4. A truck formed of truck units each consisting of a pair of bars, a pair of wheels mounted close together between said bars, spacers between said bars, bolts connecting said bars, and connecting means between said truck units for organizing them into a truck.

In witness whereof I have hereunto affixed my signature in the presence of the witnesses herein named.

WILLIAM P. HUSSEY.

Witnesses:
HELEN B. McCORD,
NELLIE ALLEMONG.